(12) United States Patent
Ji

(10) Patent No.: US 11,853,551 B2
(45) Date of Patent: Dec. 26, 2023

(54) STORAGE SYSTEM AND DATA READING METHOD THEREOF

(71) Applicant: CHANGXIN MEMORY TECHNOLOGIES, INC., Anhui (CN)

(72) Inventor: Kangling Ji, Anhui (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 19 days.

(21) Appl. No.: 17/657,805

(22) Filed: Apr. 4, 2022

(65) Prior Publication Data
US 2023/0185454 A1 Jun. 15, 2023

(30) Foreign Application Priority Data
Dec. 14, 2021 (CN) .......................... 202111530300.7

(51) Int. Cl.
*G06F 3/06* (2006.01)
(52) U.S. Cl.
CPC ............ *G06F 3/061* (2013.01); *G06F 3/0659* (2013.01); *G06F 3/0673* (2013.01)
(58) Field of Classification Search
CPC ...... G06F 3/061; G06F 3/0659; G06F 3/0673; G06F 3/0635; G06F 3/0688; Y02D 10/00
See application file for complete search history.

(56) References Cited

U.S. PATENT DOCUMENTS

| | | | | |
|---|---|---|---|---|
| 5,438,536 | A * | 8/1995 | Salzman | G11C 5/14 365/52 |
| 6,128,654 | A | 10/2000 | Runaldue et al. | |
| 9,658,666 | B1 * | 5/2017 | Ghayal | H02M 1/0043 |
| 2017/0255394 | A1 * | 9/2017 | Suh | G11C 7/1006 |
| 2021/0124699 | A1 | 4/2021 | Shimizu | |

FOREIGN PATENT DOCUMENTS

| | | |
|---|---|---|
| CN | 113656501 A | 11/2021 |
| TW | 449694 B | 8/2001 |

OTHER PUBLICATIONS

TW Office Action cited in TW111127811, dated Mar. 14, 2023, 15 pages.
Non-Final Office Action cited in U.S. Appl. No. 17/657,812, dated Jun. 23, 2023, 29 pages.

* cited by examiner

*Primary Examiner* — Larry T MacKall
(74) *Attorney, Agent, or Firm* — Cooper Legal Group, LLC

(57) ABSTRACT

The embodiments of the present disclosure relate to the technical field of semiconductors and provide a storage system and a data reading method thereof. The storage system is configured to: enter a read data copy mode in response to a read-copy enable signal; if at least two groups of data in multiple groups of data exported from a memory array are a same in the read data copy mode, define the at least two groups of data as a category; export an identification signal that is used to indicate a data copy; transmit one group of data in the category to a corresponding data port; and disconnect a transmission path that is used to transmit another group of data in the category to a corresponding data port.

17 Claims, 4 Drawing Sheets

STORAGE SYSTEM AND DATA READING METHOD THEREOF

CROSS-REFERENCE TO RELATED APPLICATIONS

This application claims the priority of Chinese Patent Application No. 202111530300.7, submitted to the Chinese Intellectual Property Office on Dec. 14, 2021, the disclosure of which is incorporated herein in its entirety by reference.

TECHNICAL FIELD

Embodiments of the present disclosure relate to the technical field of semiconductors, and in particular, to a storage system and a data reading method thereof.

BACKGROUND

A storage device is often used to store and read information in a wide range of electronic systems such as a mobile phone, a tablet, a computer, a server, and an electronic system that includes a processor or requires information storage. A storage device can be controlled by using a storage device-based command such as a read command or write command that is received by using a command bus. Information to be stored can be written to a storage device by using a write command, and then read and retrieved from the storage device by using a read command.

Multiple data transmission channels can be concurrently driven to read multiple data entries from a storage device. However, if some of the multiple data entries are the same, more power is required to drive multiple data transmission channels than to drive a single data transmission channel.

SUMMARY

The embodiments of the present disclosure provide a storage system and a data reading method thereof.

According to some embodiments of the present disclosure, one aspect provides a storage system, wherein the storage system is configured to: enter a read data copy mode in response to a read-copy enable signal; if at least two groups of data in multiple groups of data exported from a memory array are the same in the read data copy mode, define the at least two groups of data as a category; export an identification signal that is used to indicate a data copy; transmit one group of data in the category to a corresponding data port; and disconnect a transmission path that is used to transmit another group of data in the category to a corresponding data port.

According to some embodiments of the present disclosure, another aspect provides a data reading method of a storage system, including: entering a read data copy mode in response to a read-copy enable signal; if at least two groups of data in multiple groups of data exported from a memory array are the same in the read data copy mode, defining the at least two groups of data as a category; exporting an identification signal that is used to indicate a data copy; transmitting one group of data in the category to a corresponding data port; and disconnecting a transmission path that is used to transmit another group of data in the category to a corresponding data port.

BRIEF DESCRIPTION OF THE DRAWINGS

One or more embodiments are exemplified by corresponding accompanying drawings, and these exemplified descriptions do not constitute a limitation on the embodiments. Components with the same reference numerals in the accompanying drawings are denoted as similar components, and the accompanying drawings are not limited by scale unless otherwise specified.

DETAILED DESCRIPTION

To resolve the issues mentioned in the background, a solution is required to reduce power consumption in data reading from a storage system.

The analyses show that the interface specifications for storage devices provide a read data copy mode. In this mode, if multiple groups of data to be exported are the same, only one group of data in the multiples groups of data is transmitted, while an output terminal of a data channel for another group of data forcibly exports 0 and sends an identification at a data mask port to indicate that a data copy occurs. After receiving data and discovering the identification at the data mask port, a receive end copies the group of normally transmitted data to a data port whose input is 0 for the another group of data, to obtain a full data copy.

However, the transmission path for the another group of data is still activated, which may still cause power consumption during data transmission.

The embodiments of the present disclosure provide a storage system and a data reading method thereof. In a read data copy mode, if finding that multiple groups of data exported from a memory array include same groups of data, the storage system activates a transmission path that is used to transmit one group of data in the same groups of data to outside the storage system but disconnects a transmission path that is used to transmit another group of data in the same groups of data to outside the storage system. In this way, no additional power consumption is caused on the transmission path corresponding to the another group of data in the same groups of data during data transmission. Therefore, power consumption in reading data from the storage system can be reduced.

The embodiments of the present disclosure are described in detail below with reference to the drawings. Those skilled in the art should understand that many technical details are proposed in the embodiments of the present disclosure to make the present disclosure better understood. However, even without these technical details and various changes and modifications made based on the following embodiments, the technical solutions claimed in the embodiments of the present disclosure may still be realized.

Figure 1:
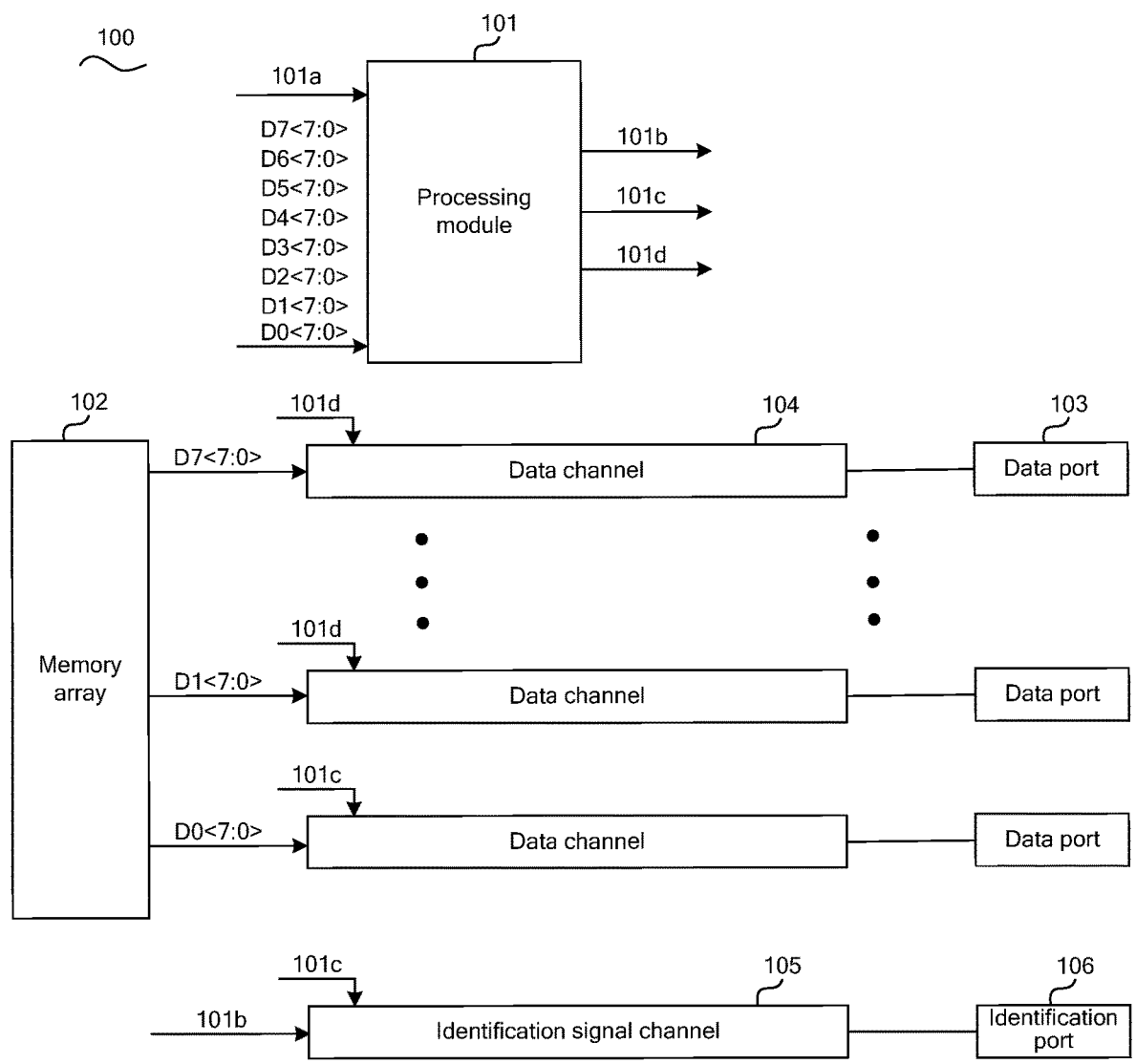
FIG. 1 is a schematic diagram of a functional structure of a storage system according to an embodiment of the present disclosure.
Figure 2:
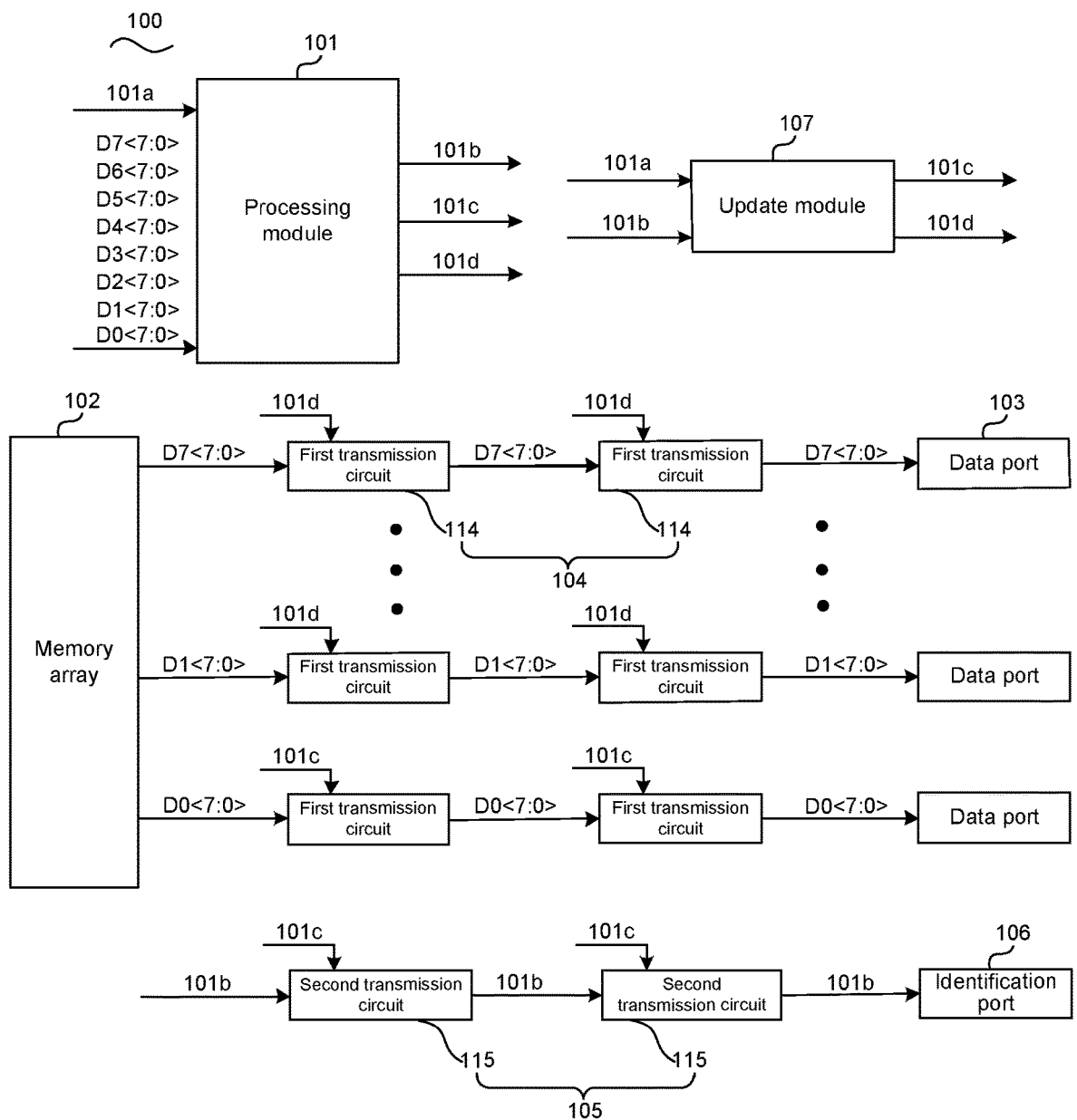
FIG. 2 is another schematic diagram of a functional structure of a storage system according to an embodiment of the present disclosure.
Figure 3:
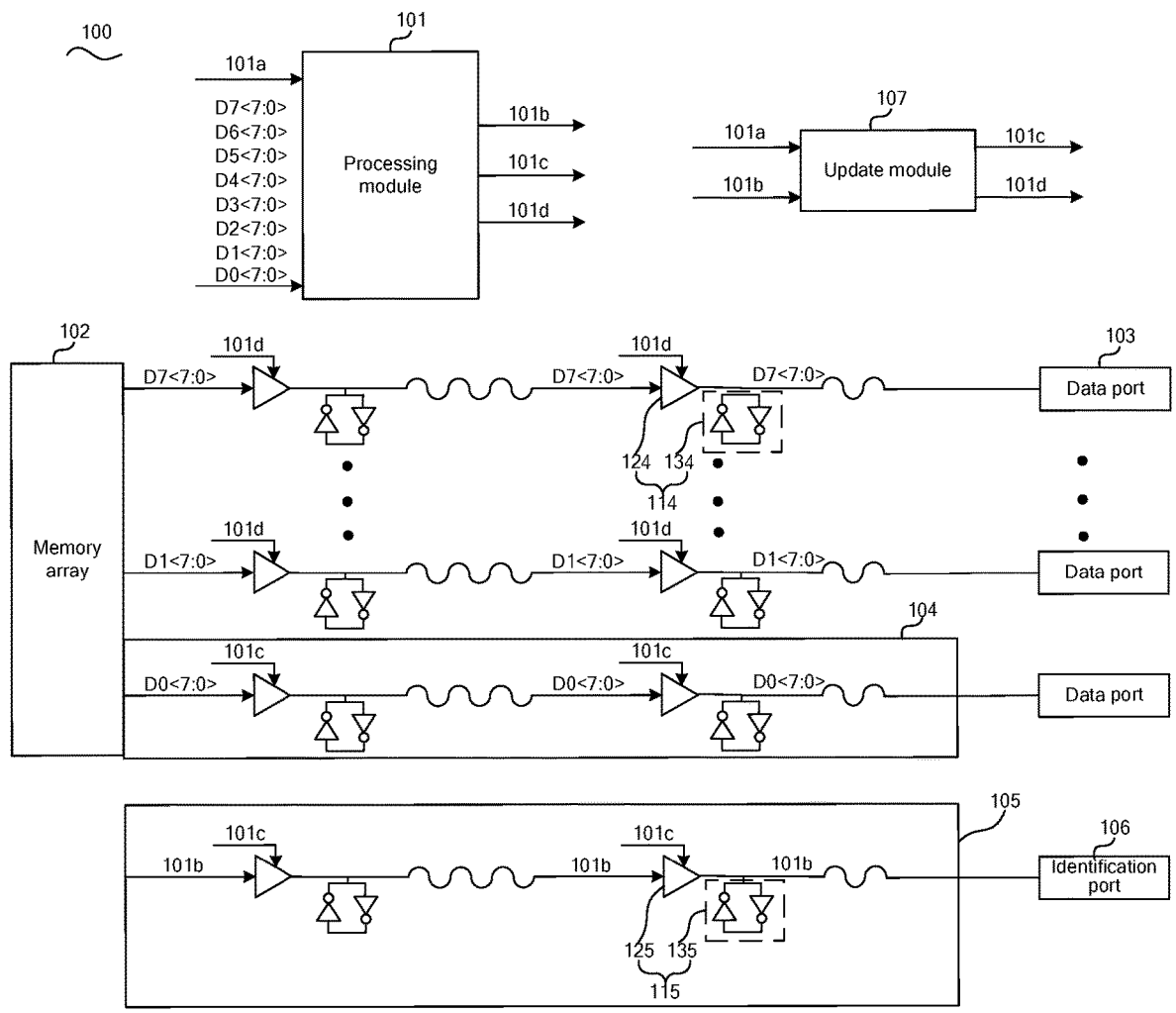
FIG. 3 is still another schematic diagram of a functional structure of a storage system according to an embodiment of the present disclosure.
Figure 4:
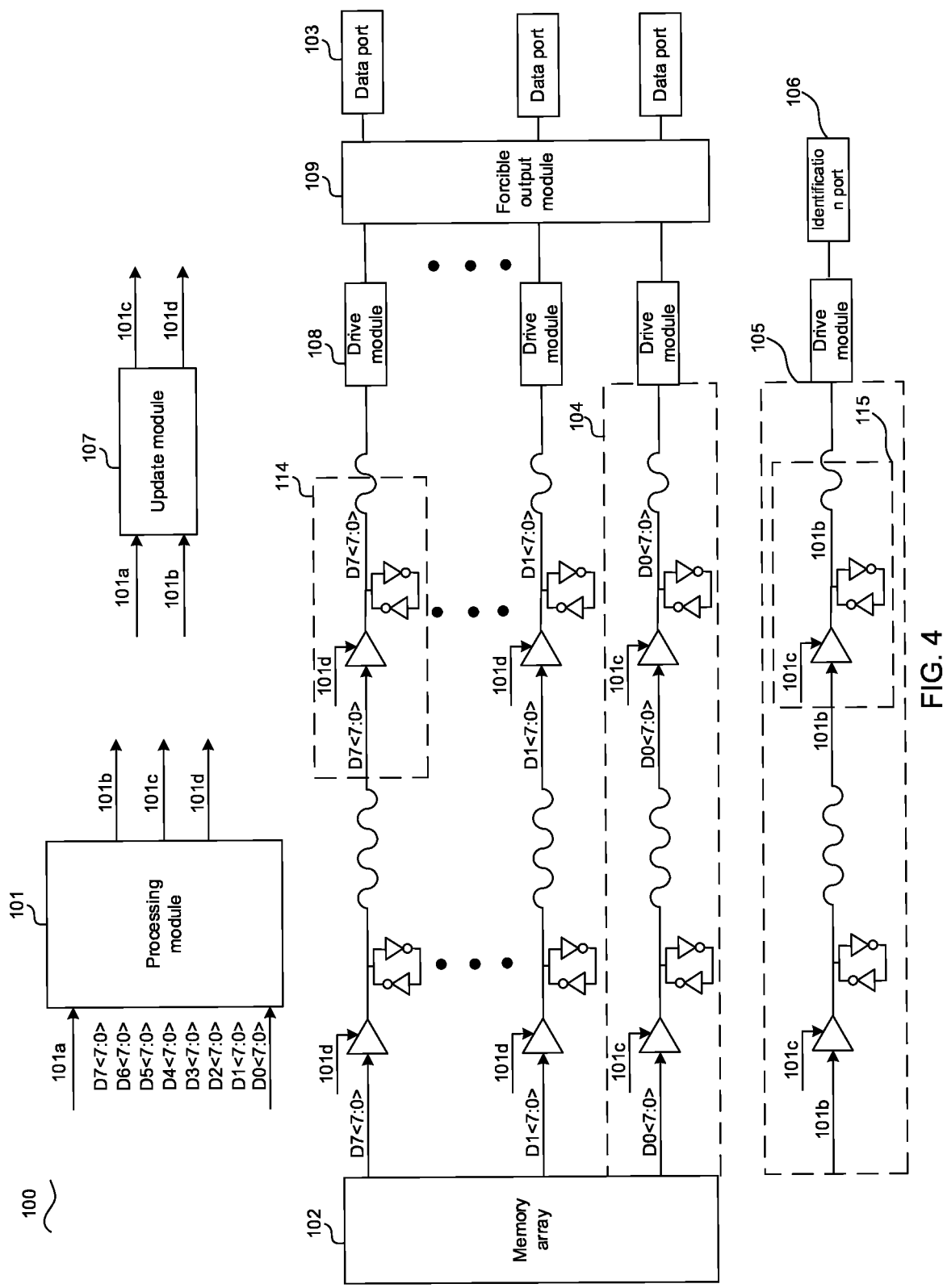
FIG. 4 is yet another schematic diagram of a functional structure of a storage system according to an embodiment of the present disclosure.

An embodiment of the present disclosure provides a storage system. The storage system provided by the embodiment of the present disclosure is described in detail below with reference to the drawings. FIG. 1 is a schematic diagram of a functional structure of a storage system according to an embodiment of the present disclosure. FIG. 2 is another schematic diagram of a functional structure of a storage system according to an embodiment of the present disclosure. FIG. 3 is still another schematic diagram of a functional structure of a storage system according to an embodiment of the present disclosure. FIG. 4 is yet another schematic diagram of a functional structure of a storage system according to an embodiment of the present disclosure.

In the embodiments of the present disclosure, referring to FIG. 1, a storage system 100 is configured to: enter a read data copy mode in response to a read-copy enable signal 101a; if at least two groups of data in multiple groups of data exported from a memory array 102 are the same in the read data copy mode, define the at least two groups of data as a category; export an identification signal 101b that is used to indicate a data copy; transmit one group of data in the category to a corresponding data port 103; and disconnect a transmission path that is used to transmit another group of data in the category to the corresponding data port 103.

In some embodiments, still referring to FIG. 1, the memory array 102 may export the following eight groups of data: D0<7:0>, D1<7:0>, D2<7:0>, D3<7:0>, D4<7:0>, D5<7:0>, D6<7:0>, and D7<7:0>. Each of the eight groups of data includes an eight-bit unsigned number. If any two groups of data are the same, eight-bit unsigned numbers in the two groups of data have the same sequence. It should be noted that, in FIG. 1, that eight groups of data are exported from the memory array 102 and each group of data includes an eight-bit unsigned number are merely examples. In actual application, the number of groups of data exported from the memory array 102 and the number of bits for an unsigned number in each group of data are not limited.

The eight groups of data include at least two same groups of data. For example, D0<7:0> and D1<7:0> are the same. In this case, the storage system can define D0<7:0> and D1<7:0> as a category, export an identification signal 101b that is used to indicate a data copy, transmit D0<7:0> to a corresponding data port 103, and disconnect a transmission path between D1<7:0> and a corresponding data port 103. In this way, no additional power consumption is caused on the transmission path between D1<7:0> and the corresponding data port 103. Therefore, power consumption in reading data from the storage system 100 can be reduced.

The following uses three embodiments to describe how to read data from a storage device.

In some embodiments, the storage system 100 may be further configured to export the identification signal 101b if all of the multiple groups of data are the same. For example, D0<7:0>, D1<7:0>, D2<7:0>, D3<7:0>, D4<7:0>, D5<7:0>, D6<7:0>, and D7<7:0> include same data. In this case, the storage system 100 can activate a transmission path between the corresponding data port 103 and any group of data, such as D0<7:0>, in the eight groups of data, and disconnects transmission paths between the corresponding data ports 103 and the other seven groups of data such as D1<7:0>, D2<7:0>, D3<7:0>, D4<7:0>, D5<7:0>, D6<7:0>, and D7<7:0>. This prevents unnecessary power consumption on the transmission paths corresponding to the other seven groups of data when the eight groups of data are the same. Therefore, power consumption in reading data from the storage system 100 can be reduced.

It should be noted that all of N groups of data may be the same in actual application. In this case, unnecessary power consumption on N−1 transmission paths corresponding to N−1 groups of data can be prevented during the transmission of the N groups of data. Therefore, power consumption in reading data from the storage system is reduced. N is an integer greater than or equal to 2.

If all of the multiple groups of data are the same, the identification signal 101b can be a one-bit data mask signal. Therefore, it can be learnt, based on the data mask signal, that all of the multiple groups of data in the data transmission are the same. This facilitates subsequent copy of data that is exported from the activated transmission path so as to obtain required data.

In some other embodiments, the storage system 100 may be further configured to: if the multiple groups of data have at least one group of data whose data is different from the data in the category, transmit the at least one group of data to the corresponding data port 103 and export a position signal (not shown in the figure). The position signal is used to indicate a position of a transmission path corresponding to the at least one group of data and a position of the data port 103.

For example, in D0<7:0>, D1<7:0>, D2<7:0>, D3<7:0>, D4<7:0>, D5<7:0>, D6<7:0>, and D7<7:0>, the former six groups of data are the same but different from D6<7:0> and D7<7:0>, wherein D7<7:0> is different from D6<7:0>. In other words, the eight groups of data are classified into three different categories. In this case, the storage system 100 transmits data in D0<7:0> to the data port 103 corresponding to D0<7:0> and transmits, based on the position signal, data in D6<7:0> to the data port 103 corresponding to D6<7:0> and data in D7<7:0> to the data port 103 corresponding to D7<7:0>. In this way, positions of transmission paths and data ports 103 corresponding to D0<7:0>, D6<7:0>, and D7<7:0> are obtained based on the position signal. This prevents data transmitted to the data port 103 from being misread. In addition, the three transmission paths are activated to ensure that data in D0<7:0>, D6<7:0>, and D7<7:0> is transmitted, and the remaining five transmission paths are disconnected to prevent unnecessary power consumption during data transmission.

All of D0<7:0>, D1<7:0>, D2<7:0>, D3<7:0>, D4<7:0>, and D5<7:0> are the same. Therefore, the activation of the transmission path between any of these groups of data and the corresponding data port 103 can meet the requirements in actual application. For ease of description, the transmission path between D0<7:0> and the data port 103 corresponding to D0<7:0> is activated.

It should be noted that the foregoing example is used only for easy description. In actual application, data transmission can be implemented based on the foregoing solution if the multiple groups of data have at least one group of data whose data is different from the data in the category.

The position signal and the identification signal can be generated by a same functional component. This saves functional components in the storage system and improves the utilization of a single functional component. In some embodiments, the position signal and the identification signal can be generated by a processing component 101.

In some examples, the storage system can be configured to: control data ports 103 corresponding to specific transmission paths to copy data based on the position signal. In other words, the storage system can learn disconnected transmission paths based on the position signal and copy the data that is transmitted on the activated transmission path to the data ports 103 corresponding to the disconnected transmission paths. For example, D0<7:0>, D1<7:0>, D2<7:0>, D3<7:0>, D4<7:0>, and D5<7:0> are the same. In this case, after learning, based on the position signal, that the transmission path between D0<7:0> and the data port 103 corresponding to D0<7:0> is activated, the storage system disconnects five transmission paths corresponding to D1<7:0>, D2<7:0>, D3<7:0>, D4<7:0>, and D5<7:0> and copies the transmitted group of data D0<7:0> to the five data ports 103 corresponding to D1<7:0>, D2<7:0>, D3<7:0>, D4<7:0>, and D5<7:0>. Further, the storage system may be configured to control the activation and disconnection of transmission paths based on the position signal. In this way, the processing component does not need to generate drive signals to control the activation and disconnection of transmission paths.

In some other embodiments, the identification signal 101*b* in the storage system may be further used to the identify different categories if the number of categories is greater than or equal to 2.

For example, in D0<7:0>, D1<7:0>, D2<7:0>, D3<7:0>, D4<7:0>, D5<7:0>, D6<7:0>, and D7<7:0>, the former fourth groups of data are the same and the latter fourth groups of data are the same. However, D0<7:0> is different from D4<7:0>. In other words, the eight groups of data are classified into two different categories. In this case, the storage system 100 transmits data in D0<7:0> to the data port 103 corresponding to D0<7:0> and data in D4<7:0> to the data port 103 corresponding to D4<7:0> based on the identification signal 101*b*. In this way, the identification signal 101*b* not only indicates which groups of data are the same but also indicates positions of same groups of data. This prevents data transmitted to the data port 103 from being misread. In addition, the remaining six transmission paths can be disconnected based on the identification signal 101*b*. This prevents unnecessary power consumption during data transmission.

In addition, D0<7:0>, D1<7:0>, D2<7:0>, and D3<7:0> are the same. Therefore, the activation of a transmission path between any of these groups of data and the corresponding data port 103 can meet the requirements in actual application. For ease of description, the transmission path between D0<7:0> and the data port 103 corresponding to D0<7:0> is activated. D4<7:0>, D5<7:0>, D6<7:0>, and D7<7:0> are the same. Therefore, the activation of a transmission path between any of these groups of data and the corresponding data port 103 can meet the requirements in actual application. For ease of description, the transmission path between D4<7:0> and the data port 103 corresponding to D4<7:0> is activated.

It should be noted that the foregoing example is used only for easy description. In this example, the number of categories is 2, and the groups of data D0<7:0>, D1<7:0>, D2<7:0>, and D3<7:0> are the same. In actual application, other groups of data may be the same, and the same groups of data may include multiple consecutive groups of data or inconsecutive groups of data. This is not limited in the embodiments of the present disclosure. In addition, the number of categories may be greater than 2.

In the storage system in the foregoing three embodiments, the data ports 103 corresponding to the other groups of data in the category export a preset value. The transmission paths for transmitting the other groups of data to the corresponding data ports 103 are disconnected. Therefore, the data ports 103 corresponding to the other groups of data cannot receive real data but export a preset value to indicate that data to be exported from these data ports 103 is the same as that transmitted on the activated transmission path. This further prevents data that is exported by the data ports 103 corresponding to the other groups of data from being misread. In addition, the export of a preset value can be used to meet the Joint Electron Device Engineering Council (JEDEC) standards, wherein the JEDEC standards are formulated by JEDEC Solid State Technology Association. The export of a preset value can reduce power consumption in exporting data from the data port 103. Therefore, power consumption in reading data from the storage system 100 is reduced. In some embodiments, the preset value can be 0.

Referring to FIG. 1, the storage system in the embodiments of the present disclosure includes the processing component 101, multiple data channels 104, and an identification signal channel 105. The processing component 101 is configured to: in response to the read-copy enable signal 101*a* and the multiple groups of data, generate a first drive signal 101*c*, a second drive signal 101*d*, and the identification signal 101*b*. The data channel 104 serves as a transmission path for transmitting a group of data between the memory array 102 and the data port 103. The data channel 104 corresponding to the one group of data in the category is activated in response to the first drive signal 101*c*, and the data channels 104 corresponding to the other groups of data in the category are disconnected in response to the second drive signal 101*d*. The identification signal channel 105 is located between the processing component 101 and an identification port 106 and is activated in response to the first drive signal 101*c* so as to transmit the identification signal 101*b* to the identification port 106.

A data channel 104 for any one group of data in the category is selected and activated by receiving the first drive signal 101*c*, and the data channels 104 for the other groups of data in the category are disconnected by receiving the second drive signal 101*d*. In this way, when multiple groups of same data are transmitted, the first drive signal 101*c* can be used to control the activation of only one data channel 104, and the second drive signal 101*d* can be used to control the disconnection of the data channels 104 corresponding to the other groups of data in the multiple groups of data. This can prevent unnecessary power consumption on the transmission paths corresponding to the other groups of data in the multiple groups of data. Therefore, power consumption in reading data from the storage system 100 is further reduced.

In some embodiments, the storage system can include a control component (not shown in the figure). The control component can control, based on the position signal, data ports 103 corresponding to specific transmission paths to copy data. In other words, the control component can learn disconnected transmission paths based on the position signal and copy the data that is transmitted on the activated transmission path to the data ports 103 corresponding to the disconnected transmission paths. Further, the control component can control the activation and disconnection of transmission paths based on the position signal. In this way, the processing component 101 does not need to generate the first drive signal 101*c* to control the activation of a transmission path or generate the second drive signal 101*d* to control the disconnection of a transmission path.

In some embodiments, referring to FIG. 2, the data channel 104 may include multiple first transmission circuits 114 that are serially connected, and each stage of the multiple first transmission circuits 114 is activated based on the first drive signal 101*c* or the second drive signal 101*d*. The identification signal channel 105 may include multiple second transmission circuits 115 that are serially connected, and each stage of the multiple second transmission circuits 115 is activated based on the first drive signal 101*c* to transmit the identification signal 101*b*.

When data is transmitted from the memory array 102 to the data port 103, data distortion is prone to occur because the data channel 104 is long. In other words, data that is exported from the memory array 102 becomes different when the data is transmitted to the data port 103. As a result, the data from the memory array 102 may be misread. Therefore, the data channel 104 that includes multiple first transmission circuits 114 that are serially connected can help ensure that data to be transmitted on the data channel 104 is processed by each first transmission circuit 114 and is transmitted without distortion.

Data distortion is also prone to occur during the transmission of the identification signal 101*b* because the identification signal channel 105 is long. In other words, the identification signal 101*b* that is exported from the processing component 101 becomes different when the identification signal 101*b* is transmitted to the identification port 106. As a result, the identification signal 101*b* may be misread. This also makes it difficult to determine whether a data copy occurs among the multiple groups of data in the memory array 102 based on the identification signal 101*b* and which groups of data are the same. Therefore, the identification signal channel 105 that includes multiple second transmission circuits 115 that are serially connected can help ensure that the identification signal 101*b* to be transmitted on the identification signal channel 105 is processed by each second transmission circuit 115 and is transmitted without distortion.

It should be noted that, in FIG. 2, that the data channel 104 includes two serially connected first transmission circuits 114 and the identification signal channel 105 includes two serially connected second transmission circuits 115 are merely examples. In actual application, the number of first transmission circuits 114 on the data channel 104 and the number of second transmission circuits 115 on the identification signal channel 105 are not limited.

Still referring to FIG. 2, the storage system 100 may further include an update component 107, wherein the update component 107 is configured to: in response to the read-copy enable signal 101*a* and an identification signal 101*b* that is exported by a previous second transmission circuit 115, generate a new first drive signal 101*c* or a new second drive signal 101*d* to drive a next first transmission circuit 114.

The identification signal 101*b* can be used to indicate a data copy, that is, indicate which groups of data are the same. Therefore, the update component 107 can generate, based on the identification signal 101*b* that is exported by the previous second transmission circuit 115, the new first drive signal 101*c* for a next first transmission circuit 114 that needs to transmit data, and the new second drive signal 101*d* for a next first transmission circuit 114 of a first transmission circuit 114 that resides on a disconnected data channel 104. This ensures that data to be transmitted on the data channel 104 is processed by each first transmission circuit 114 and is transmitted without distortion. This also ensures that each first transmission circuit 114 on the data channels 104 corresponding to the other groups of data in the category is disconnected. Therefore, no interference is caused to data transmission, and power consumption in reading data from the storage system 100 is reduced.

In some embodiments, referring to FIG. 3, the first transmission circuit 114 may include a first driver 124 and a first latch 134. The first driver 124 drives the first transmission circuit 114 in response to the first drive signal 101*c*, or disconnects the first transmission circuit 114 in response to the second drive signal 101*d*. In this way, after the first driver 124 is activated, data transmitted on the first transmission circuit 114 is divided into two parts. One part is transmitted to the first latch 134 and is latched. The other part is transmitted to the next first transmission circuit 114.

The second transmission circuit 115 can include a second driver 125 and a second latch 135. The second driver 125 drives the second transmission circuit 115 in response to the first drive signal 101*c*. In this way, after the second driver 125 is activated, data transmitted on the second transmission circuit 115 is divided into two parts. One part is transmitted to the second latch 135 and is latched. The other part is transmitted to a next second transmission circuit 115.

In some embodiments, the processing component 101 may be further configured to export a third drive signal (not shown in the figure) if the multiple groups of data include at least one group of data having different data, wherein the data channel 104 corresponding to the at least one group of data having different data is activated in response to the third drive signal.

In the multiple groups of data, some groups of data are the same, while other groups of data are different. The first drive signal 101*c* and second drive signal 101*d* are generated based on the same groups of data, and the third drive signal is generated based on the other groups of data that are different. This ensures that only one data channel 104 in the multiple data channels 104 corresponding to the same groups of data is activated to reduce power consumption in data transmission. This also ensures that the data channels 104 corresponding to the other groups of data that are different are activated based on the third drive signal.

In some embodiments, referring to FIG. 4, the storage system 100 may further include multiple drive components 108. Each of the multiple drive components 108 is located between a data channel 104 and a data port 103 and is configured to: if the data channel 104 that is connected to the drive component 108 is activated, forward data that is transmitted on the data channel 104 to the data port 103. In this case, if the data channel 104 that is connected to the drive components 108 is disconnected, the drive components 108 is disconnected to prevent unnecessary power consumption generated by the drive components 108. This helps reduce power consumption in reading data from the storage system 100.

In some embodiments, still referring to FIG. 4, the storage system 100 may further include a forcible output component 109. The forcible output component 109 is located between the data channel 104 and the data port 103, and is configured to: in response to the read-copy enable signal 101*a* and the identification signal 101*b*, force the data port 103 corresponding to the another group of data in the same groups of data to export a preset value. In this way, if the data channel 104 that is connected to the drive components 108 is disconnected, the forcible output component 109 forces the data port 103 corresponding to the disconnected data channel 104 to export a preset value to meet the JEDEC standards. The export of a preset value can reduce power consumption in exporting data from the data port 103. Therefore, power consumption in reading data from the storage system 100 is reduced. In addition, the preset value can be used to indicate that data to be exported from the data port 103 is the same as the data transmitted on the activated data channel 104. This helps further prevent data that is exported from the data ports 103 corresponding to the other groups of data in the category from being misread.

In some embodiments, the storage system 100 may further include a detection component (not shown in the figure). The detection component is configured to detect whether the data channel 104 is activated and export a status signal, wherein the status signal is used to indicate whether the data channel 104 is activated.

The number of categories in the multiple groups of data that need to be transmitted in the memory array 102 may be greater than or equal to 2. In this case, the detection component can be used to detect whether the data channel 104 is activated. This helps identify which data ports 103 corresponding to the data channels 104 have same data to be transmitted and which data ports have different data to be transmitted. This prevents data exported from the data port 103 from being misread. For example, if the detection component detects that a data channel 104 is disconnected, the disconnected data channel 104 and the activated data channel 104 have same data to be transmitted. In this case, the detection component forces a data port 103 corresponding to the disconnected data channel 104 to export a preset value such as 0, and then copies data that is transmitted on the activated data channel 104 to an output terminal of the data port 103 corresponding to the disconnected data channel 104. If detecting that a data channel 104 is activated and a data port 103 corresponding to the activated data channel 104 exports 0, the detection component does not copy the data that is exported from this data port 103 subsequently so as to prevent the data exported from the data port 103 from being misread.

To sum up, in a read data copy mode, if finding that multiple groups of data exported from the memory array 102 include same data, the storage system 100 activates a data channel 104 that is used to transmit one group of data in the category to outside the storage system 100 but disconnects a data channel 104 that is used to transmit another group of data in the category to outside the storage system 100. In this way, no additional power consumption is caused on the data channel 104 corresponding to the another group of data in the category during the data transmission. Therefore, power consumption in reading data from the storage system 100 can be reduced.

Another embodiment of the present disclosure further provides a data reading method of a storage system, which is applicable to the storage system provided in the foregoing embodiments. The data reading method of the storage system provided by the another embodiment of the present disclosure is described in detail below with reference to the drawings.

The data reading method of the storage system includes the following steps: Enter a read data copy mode in response to a read-copy enable signal. If at least two groups of data in multiple groups of data exported from a memory array are the same in the read data copy mode, define the at least two groups of data as a category. Export an identification signal that is used to indicate a data copy. Transmit one group of data in the category to a corresponding data port. Disconnect a transmission path that is used to transmit another group of data in the category to a corresponding data port. In this way, no additional power consumption is caused on the transmission path between the another group of data in the category and the corresponding data port. Therefore, power consumption in reading data from the storage system can be reduced.

In some embodiments, the step of exporting the identification signal that is used to indicate a data copy may include the following sub steps: Determine whether all of the multiple groups of data are the same. If all of the multiple groups of data are the same, export the identification signal. In this way, if all of N groups of data are the same, the identification signal can be used to disconnect transmission paths corresponding to N−1 groups of data during the transmission of the N groups of data. This prevents unnecessary power consumption on the N−1 transmission paths corresponding to the N−1 groups of data. Therefore, power consumption in reading data from the storage system is reduced. N is an integer greater than or equal to 2.

In some embodiments, the data reading method of the storage system may further include the following step: The data port corresponding to the another group of data in the category exports a preset value. In this way, the preset value can be used to indicate that data to be transmitted on the another group of data in the category is the same as the data transmitted on the activated transmission path. This helps further prevent data exported by the data port corresponding to the another group of data from being misread. In addition, the export of the preset value can be used to meet the JEDEC standards. This helps further reduce power consumption in exporting data from the data port 103. Therefore, power consumption in reading data from the storage system 100 is reduced. The preset value can be 0.

In some embodiments, the data reading method of the storage system may further include the following step: If the multiple groups of data have at least one group of data whose data is different from the data in the category, transmit the at least one group of data to a corresponding data port and export a position signal. The position signal is used to indicate a position of a transmission path corresponding to the at least one group of data and a position of the data port. In this way, the position signal can be used to obtain a position of a transmission path corresponding to the one group of data that is transmitted in the category, and the position of the transmission path corresponding to the at least one group of data that has data different from the data in the category. This prevents data transmitted to the data port from being misread. In addition, the transmission path corresponding to the one group of data in the category is activated, and the at least one transmission path corresponding to the at least one group of data that has data different from that in the category is also activated. This helps prevent unnecessary power consumption in data transmission and enables concurrent transmission of at least two different groups of data.

In some embodiments, the data reading method of the storage system may further include the following step: Transmit the identification signal to an identification port. The step of transmitting one group of data in the category to a corresponding data port and transmitting the identification signal to an identification port include the following sub steps: In response to the read-copy enable signal and the multiple groups of data, generate a first drive signal and a second drive signal. Activate a data channel corresponding to the one group of data in the category in response to the first drive signal and disconnect a data channel corresponding to the another group of data in the category in response to the second drive signal so as to transmit the one group of data in the category to the corresponding data port. Activate an identification signal channel corresponding to the identification signal in response to the first drive signal so as to transmit the identification signal to the identification port.

In this way, when multiple groups of same data are transmitted, the first drive signal can be used to control the activation of only one data channel in data channels corresponding to the multiple groups of data, and the second drive signal can be used to control the disconnection of the data channel corresponding to the another group of data in the multiple groups of data. This can prevent unnecessary power consumption on the transmission path corresponding to the another group of data in the multiple groups of data. Therefore, power consumption in reading data from the storage system is further reduced. Subsequently, the identification signal can be used to copy the data that is transmitted on the activated data channel to the data port corresponding to the another group of data in the multiple groups of data.

The data channel may include multiple first transmission circuits that are serially connected, and each stage of the multiple first transmission circuits is activated based on the first drive signal or the second drive signal. The identification signal channel may include multiple second transmission circuits that are serially connected, and each stage of the multiple second transmission circuits is activated based on the first drive signal to transmit the identification signal. This can ensure that data to be transmitted on the data channel is processed by each first transmission circuit and is transmitted without distortion. This can also ensure that the identification signal to be transmitted on the identification signal channel is processed by each second transmission circuit and is transmitted without distortion.

Therefore, the step of transmitting one group of data in the category to a corresponding data port and transmitting the identification signal to an identification port may further include the following sub step: in response to the read-copy enable signal and an identification signal that is exported from a previous node of a transmission path of the identification signal, generate a new first drive signal and a new second drive signal. The new first drive signal and new second drive signal serve as drive signals on a next node of the transmission path.

This ensures that data to be transmitted on the data channel is processed by each first transmission circuit and is transmitted without distortion. This also ensures that each first transmission circuit on the data channel corresponding to the another group of data in the category is disconnected. Therefore, no interference is caused to data transmission, and power consumption in reading data from the storage system is reduced.

To sum up, if finding that multiple groups of data exported from a memory array include same groups of data in the process of entering a read data copy mode in response to a read-copy enable signal, the storage system exports an identification signal that is used to indicate a data copy. Based on the identification signal, the storage system activates a data channel that is used to transmit one group of data in the same groups of data to outside the storage system but disconnects a data channel that is used to transmit another group of data in the same groups of data to outside the storage system. In this way, no additional power consumption is caused on the data channel corresponding to the another group of data in the same groups of data during the data transmission. Therefore, power consumption in reading data from the storage system can be reduced.

Those of ordinary skill in the art can understand that the above implementations are specific embodiments for implementing the present disclosure. In practical applications, various changes may be made to the above embodiments in terms of form and details without departing from the spirit and scope of the present application. Any person skilled in the art may make changes and modifications to the embodiments without departing from the spirit and scope of the present disclosure. Therefore, the protection scope of the present disclosure should be subject to the scope defined by the claims.

The invention claimed is:

1. A storage system, comprising:
 a processor, configured to:
  enter a read data copy mode in response to a read-copy enable signal,
  define at least two groups of data in multiple groups of data exported from a memory array as a category in the read data copy mode when the at least two groups of data are the same, and
  generate an identification signal that is used to indicate a data copy, a first drive signal, and a second drive signal in response to the read-copy enable signal and the multiple groups of data;
 multiple data channels, wherein:
  each of the multiple data channels is a transmission path for transmitting a group of data between the memory array and a data port,
  a data channel corresponding to one group of data in the category is activated in response to the first drive signal to transmit the one group of data in the category to a corresponding data port; and
  a data channel corresponding to another group of data in the category is disconnected in response to the second drive signal to disconnect a transmission path that is used to transmit the another group of data in the category to a corresponding data port; and
 an identification signal channel, wherein the identification signal channel is located between the processor and an identification port and is activated in response to the first drive signal so as to transmit the identification signal to the identification port.

2. The storage system according to claim 1, wherein the processor is further configured to generate the identification signal when all of the multiple groups of data are the same.

3. The storage system according to claim 2, wherein the identification signal is a one-bit data mask signal.

4. The storage system according to claim 1, when the multiple groups of data have at least one group of data whose data is different from the data in the category, the multiple data channels are further configured to transmit the at least one group of data to a corresponding data port, and the processor is further configured to export a position signal, wherein the position signal is used to indicate a position of a transmission path corresponding to the at least one group of data and a position of the corresponding data port.

5. The storage system according to claim 1, wherein the identification signal is further used to identify different categories when a number of the categories is greater than or equal to 2.

6. The storage system according to claim 1, wherein the data port corresponding to the another group of data in the category exports a preset value.

7. The storage system according to claim 1, further comprising:
 multiple drive components, wherein each of the multiple drive components is located between a data channel and a data port and is configured to: when the data channel that is connected to the drive component is activated, forward data that is transmitted on the data channel to the data port through the drive component.

8. The storage system according to claim 1, further comprising:
 a forcible output component, wherein the forcible output component is located between the data channel and the data port and is configured to: in response to the read-copy enable signal and the identification signal, force the data port corresponding to the another group of data in the category to export a preset value.

9. The storage system according to claim 1, further comprising:

a detection component, wherein the detection component is configured to detect whether each of the multiple data channels is activated and export a status signal, wherein the status signal is used to indicate whether each of the multiple data channels is activated.

10. The storage system according to claim 1, wherein the multiple data channels each comprise:
   multiple first transmission circuits that are serially connected, and each stage of the multiple first transmission circuits is activated based on the first drive signal or the second drive signal; and
   the identification signal channel comprises:
      multiple second transmission circuits that are serially connected, and each stage of the multiple second transmission circuits is activated based on the first drive signal to transmit the identification signal.

11. The storage system according to claim 10, further comprising:
   an update component, wherein the update component is configured to: in response to the read-copy enable signal and an identification signal that is exported by a previous second transmission circuit, generate a new first drive signal or a new second drive signal to drive a next first transmission circuit.

12. The storage system according to claim 1, wherein the processor is further configured to export a third drive signal when the multiple groups of data comprise at least one group of data having different data, wherein
   a data channel corresponding to the at least one group of data having different data is activated in response to the third drive signal.

13. A data reading method of a storage system, comprising:
   entering a read data copy mode in response to a read-copy enable signal;
   defining at least two groups of data in multiple groups of data exported from a memory array as a category in the read data copy mode when the at least two groups of data are the same;
   generating an identification signal that is used to indicate a data copy, a first drive signal and a second drive signal in response to the read-copy enable signal and the multiple groups of data;
   activating a data channel corresponding to one group of data in the category in response to the first drive signal to transmit the one group of data in the category to a corresponding data port; and disconnecting a data channel corresponding to another group of data in the category in response to the second drive signal to disconnecting a transmission path that is used to transmit the another group of data in the category to a corresponding data port; and
   activating an identification signal channel corresponding to the identification signal in response to the first drive signal so as to transmit the identification signal to an identification port.

14. The data reading method according to claim 13, wherein the generating an identification signal that is used to indicate a data copy comprises:
   determining whether all of the multiple groups of data are the same; and
   when all of the multiple groups of data are the same, exporting the identification signal.

15. The data reading method according to claim 13, further comprising: exporting, by the data port corresponding to the another group of data in the category, a preset value.

16. The data reading method according to claim 13, further comprising: when the multiple groups of data have at least one group of data whose data is different from the data in the category, transmitting the at least one group of data to a corresponding data port and exporting a position signal, wherein the position signal is used to indicate a position of a transmission path corresponding to the at least one group of data and a position of the data port.

17. The data reading method according to claim 13, wherein transmitting the one group of data in the category to the corresponding data port and transmitting the identification signal to the identification port further comprise:
   in response to the read-copy enable signal and the identification signal that is exported from a previous node of a transmission path of the identification signal, generating a new first drive signal and a new second drive signal, wherein the new first drive signal and new second drive signal serve as drive signals on a next node of the transmission path.

* * * * *